United States Patent Office 3,456,751
Patented July 22, 1969

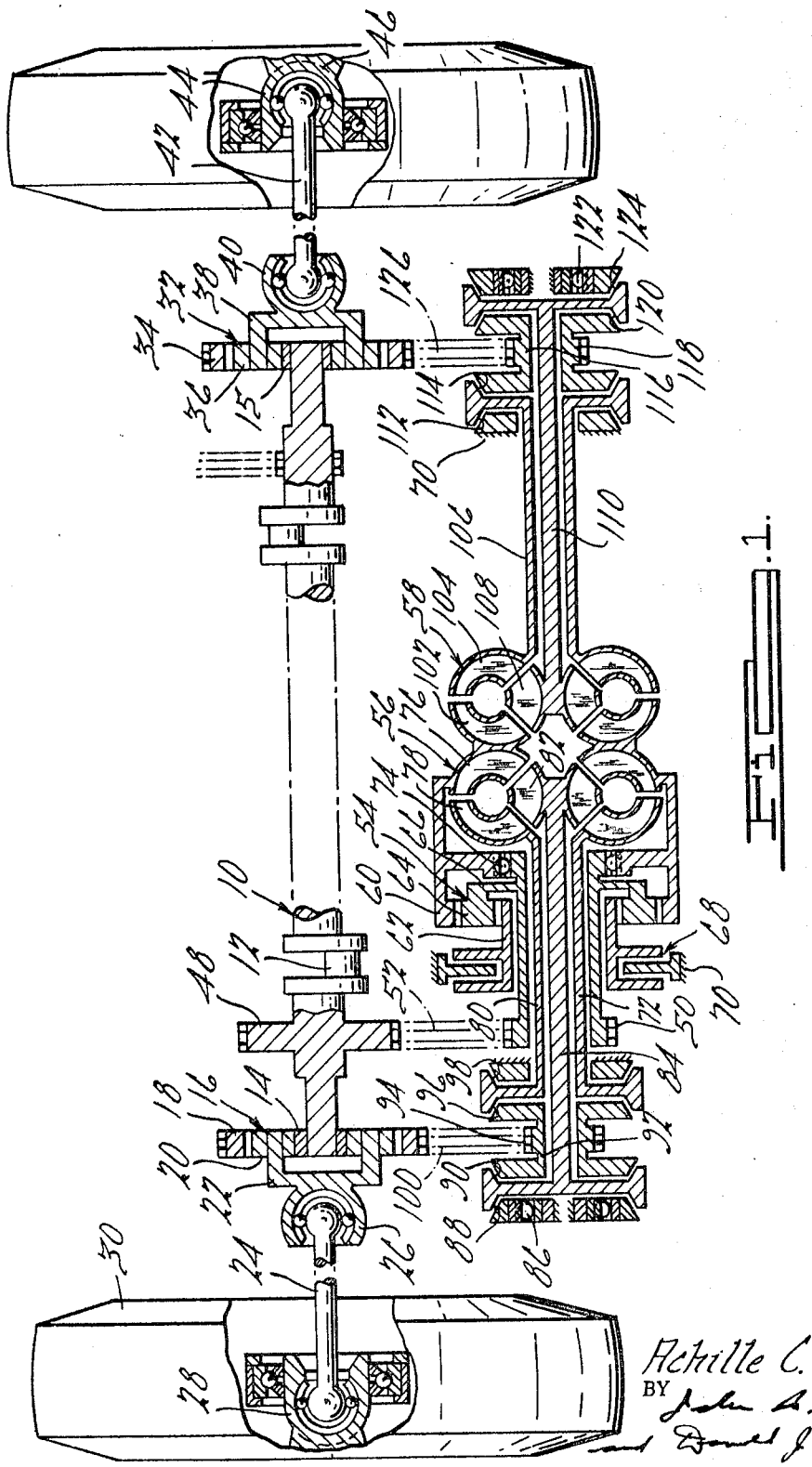

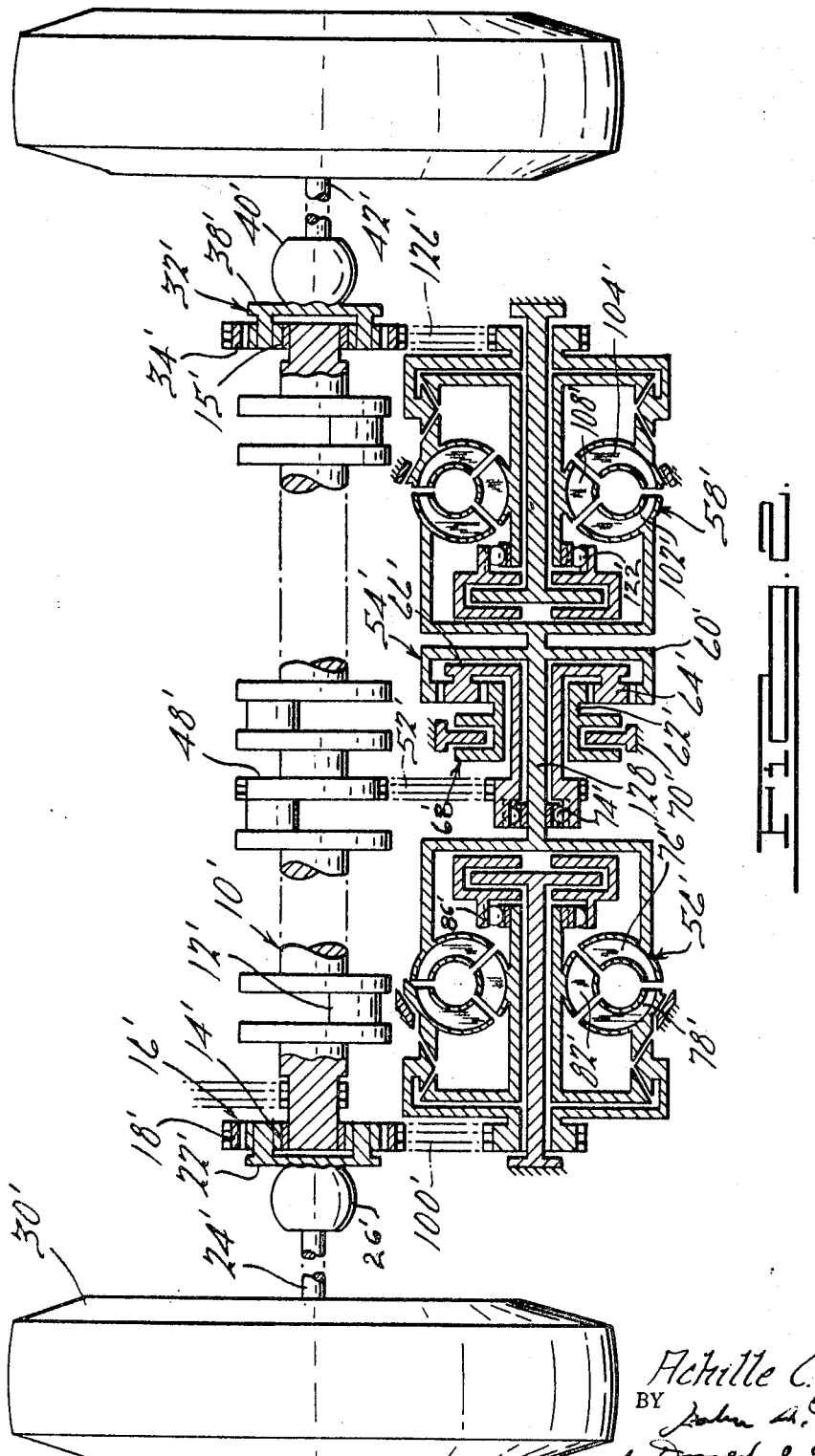

3,456,751
AUTOMOTIVE VEHICLE DRIVELINE HAVING AN INTERNAL COMBUSTION ENGINE AND MULTIPLE SPLIT TORQUE DELIVERY PATHS
Achille C. Sampietro, Bloomfield Hills, Mich., assignor to Ford Motor Company, Dearborn, Mich., a corporation of Delaware
Filed Dec. 28, 1967, Ser. No. 694,337
Int. Cl. B60k 5/04; F16h 41/22
U.S. Cl. 180—54               6 Claims

ABSTRACT OF THE DISCLOSURE

A multiple ratio power transmission mechanism for an automotive vehicle having a transversely mounted internal combustion engine driving axle shafts in line with the engine crankshaft. The crankshaft is connected by gearing to tandem hydrokinetic units having an axis parallel to the engine crankshaft and common to torque multiplying gear units and is also conected at its ends by planetary gear sets to the axle shafts with the planetary gear sets connected to the torque multiplying gear units whereby part of the engine torque is transmitted mechanically to the axle shafts and part through the hydrokinetic units. The tandem hydrokinetic units function as a differential and the torque multiplying units or the hydrokinetic units are provided with direction reversing means.

BRIEF SUMMARY OF THE INVENTION

My invention relates generally to automative vehicle drivelines which are adapted especially to be used in a front wheel drive vehicle with the engine situated transversely with respect to the geometric centerline of the vehicle.

In certain prior art driveline installations of this kind, the engine crankshaft is situated directly over the torque transmitting gears. The increases the total height of the driveline which makes it incompatible with the structural and styling requirements of the vehicle body. Also, the center of gravity of such drivelines is raised, and this might introduce instability problems. Another known driveline installation with the engine located transversely includes a transmission gearing assembly having a geometric axis situated parallel to the axis of the crankshaft and displaced a relatively long distance from it. The crankshaft axis in this case is displaced longitudinally with respect to the centerline of the vehicle from the output shaft axis. Aside from its uneconomical use of space, this arrangement makes insulation of the engine vibrations difficult.

In my improved driveline arrangement the crankshaft axis and the power output shaft axes are situated in alignment, and the torque multiplying gearing associated with the engine is situated in a compact transmission system with a portion of the torque being distributed hydrokinetically from the crankshaft to the output shafts and the balance of the torque being distributed mechanically through torque multiplying gearing.

Two hydrokinetic torque transmitting units are situated in cooperation with the torque multiplying gearing, one hydrokinetic unit being associated with each of the two driving axle shafts so that the hydrokinetic units may function as limited slip differentials thereby avoiding the need for a conventional, geared differential mechanism.

BRIEF DESCRIPTION OF THE FIGURES OF THE DRAWINGS

FIGURE 1 shows in schematic form a longitudinal cross-sectional assembly view of my improved driveline.
FIGURE 2 shows a modified form of my invention wherein the two hydrokinetic units are axially spaced.

PARTICULAR DESCRIPTION OF THE INVENTION

In FIGURE 1 numeral 10 designates a multiple throw crankshaft for an internal combustion engine. The crankshaft axis is situated transversely with respect to the vehicle centerline. It includes crank portions 12, which are connected drivably to the piston rods for the engine. A first sun gear 14 is connected to the left-hand end of the crankshaft 10, and a corresponding sun gear 15 is situated at the right-hand end. Sun gear 14 forms a part of a planetary gear unit 16, which includes also gear 18, planet pinions 20 and a planet carrier 22 on which the pinions 20 are journaled. Carrier 22 is connected to the left-hand axle shaft 24 through a universal joint 26. The outboard end of the axle shaft 24 is connected by means of universal joint 28 to a vehicle road wheel 30.

The right-hand end of the crankshaft 10 also is connected drivably to a planetary gear unit shown at 32. Gear unit 32 is the counterpart for the gear unit 16. Gear unit 32, in addition to sun gear 15, includes ring gear 34, planet pinions 36 and a carrier 38 which journals rotatably the pinions 36. The carrier 38 is connected by means of a universal joint 40 to the right-hand axle shaft 42. The outboard end of the axle shaft 42 is connected by means of universal joint 44 to a second road wheel 46.

A drive sprocket 48 is connected directly to the crankshaft 10. It drives a power input sprocket 50 by means of a drive chain 52 which encircles the sprocket 48 and the sprocket 50. Sprocket 50 forms a part of a multiple ratio gearing arrangement which includes a planetary gear unit 54 and two hydrokinetic units 56 and 58. Gear unit 54 includes a ring gear 60, sun gear 62, planet pinions 64 and a carrier 66 on which the pinions 64 are journaled. Pinions 64 are engaged drivably with ring gear 60 and sun gear 62. Selectively engageable friction brake means 68 is arranged to anchor selectively sun gear 62 against a relatively stationary housing shown in part at 70.

The sprocket 50 is connected to a sleeve shaft 72, which extends through the sun gear 62 and which is connected directly to the carrier 66. An overrunning clutch 74 connects the sleeve shaft 72 to the ring gear 60. The ring gear 60 is connected in turn to impeller 76 of hydrokinetic torque converter unit 56. This unit includes also a bladed turbine 78 which is connected to a second sleeve shaft 80 extending concentrically through sleeve shaft 72. Converter unit 56 includes also a bladed stator 82, which is connected to a central stator shaft 84.

The stator shaft 84 can be braked against rotation in a direction opposite to the direction of rotation of the impeller by means of an overrunning brake 86. This brake includes an outer race that can be clutched selectively by means of a selectively engageable friction clutch 88 to the shaft 84. A companion friction clutch 90 is used to connect the stator shaft 84 to sleeve 92 to which is connected drivable output sprocket wheel 94. When clutch 90 is engaged, clutch 88 is disengaged and vice versa. Turbine shaft 80 can be connected to sleeve 92 and sprocket 94 by means of a selectively engageable clutch 96. Sleeve shaft 80 can be braked during reverse drive, however, by engaging selectively engageable brake 98. Brake 98 is disengaged whenever clutch 96 is engaged, and vice versa.

Drive sprocket 94 is drivably connected to ring gear 18 by means of a drive chain 100. Ring gear 18 is formed with external teeth to accommodate the drive chain 100.

Torque converter unit 58 includes an impeller 102 that rotates in unison with the impeller 76. A turbine 104 is situated in toroidal fluid flow relationship with respect to the impeller 102. Turbine 104 is connected to turbine sleeve shaft 106. A bladed stator situated between the flow exit section of the turbine and the flow entrance section of the impeller, as shown at 108, can be connected to stator shaft 110. Sleeve shaft 106 may be braked to the relatively stationary housing 70 by means of a selectively engageable friction brake 112. It may be connected also by means of a selectively engageable clutch 114 to sleeve 116 to which is connected drive sprocket 118. This corresponds in function to the drive sprocket 94.

Sleeve 116 may be clutched to stator shaft 110 by means of a selectively engageable friction clutch 120. The stator shaft 110 may be braked against rotation in a direction opposite to the direction of rotation of the impeller by means of an overrunning brake 122. The outer race of brake 122 can be clutched selectively to stator shaft 110 during reverse drive operation by means of a friction clutch 124.

Drive sprocket 118 may be connected to the ring gear 34 by means of a drive chain 126. Ring gear 34 is formed with external teeth to accommodate the chain 126.

During overdrive operation a split torque delivery path is established between the crankshaft and the road wheels. Operation in the lowest forward driving speed ratio is achieved by engaging clutch 88 to permit distribution of stator torque to the stationary housing and releasing clutch 90. Clutch 96 is engaged. A portion of the crankshaft torque then is distributed directly to the sungear 14. A portion of the crankshaft torque is distributed also from sprocket 48 to sprocket 50 through the chain 52. This torque is distributed through the coupling 74 to the impeller 76 and to the impeller 102. One-half of the bypassed torque then is distributed to each hydrokinetic unit. Turbine 78 multiplies the torque of the impeller 76. The turbine torque that is developed is distributed through the shaft 80 and hence to the sprocket 94 and hence to the ring gear 18. The combined torque output flow path for the sun gear torque and the ring gear torque is accommodated by the carrier 22, which drives the wheel 30.

The balance of the torque that is bypassed through the chain 52 is transferred through the hydrokinetic unit 58. The turbine 104, which multiplies the torque of the impeller 102, drives shaft 106 which in turn drives sprocket 188 through engaged clutch 114. Ring gear 34 is driven by the chain 126. The torque delivery path thus established complements the distribution of torque through the sun gear 15. The output of the planetary gear unit 32 is the carrier 38 which drives the wheel 46.

To establish high speed ratio during forward drive operation, clutch 68 is engaged thereby anchoring sun gear 62. This overspeeds the ring gear 60. The ring gears 18 and 34 then are driven at an increased speed relative to the speed of the crankshaft 10. There thus is provided a ratio change in the torque delivery path for the bypass power delivered through the drive chain 52. The purely mechanical portion of the torque delivery path, however, assumes a constant speed ratio which complements the hydrokinetic portion of the torque delivery path.

The right-hand planetary gear unit 32 functions in a manner similar to the function of gear unit 16. Its sun gear 15 is driven by the crankshaft 10. This torque is complemented by the torque distributed through the hydrokinetic portion of the system. Like the bypass power flow path for the converter 56, the bypass flow path for the converter 58 is defined in part by the overdrive gear unit 54. Thus, two speed ratios are available in this portion of the bypass power flow path.

Reverse drive is achieved by interchanging the functions of the stator and the turbine. This is done by engaging brake 98 and releasing clutch 96. At the same time clutch 88 is released and clutch 90 is applied. Also brake 112 is applied to anchor the turbine 104 and brake 120 is applied to connect stator shaft 110 to the sprocket 118. Clutch 124 is released. Thus, the stator 82 becomes drivably coupled to ring gear 18 and stator 108 becomes drivably coupled to ring gear 34. At the same time both turbines 78 and 104 become anchored to the stationary housing. They thus can function as stators as the blade elements of stators 82 and 108 are driven in a reverse direction with respect to the direction of rotation of the impeller.

In the embodiment of FIGURE 2, the hydrokinetic units have been separated axially. Their impellers are connected by means of a centrally disposed torque delivery shaft 128. The gear unit 54', which corresponds to the gear unit 54 in the FIGURE 1 embodiment, is situated between the two hydrokinetic units rather than on the left-hand side, as in the embodiment of FIGURE 1. The elements in the FIGURE 2 construction that find counterpart elements in the FIGURE 1 construction have been identified by corresponding reference characters, although primed notations have been added.

As in the FIGURE 1 construction, the construction of FIGURE 2 provides a direct mechanical connection between the crankshaft 10' and the sun gears 14' and 15' located at the opposite ends of the crankshaft. A portion of the crankshaft torque is bypassed through drive chain 52' and is transferred through planetary gear unit 54' to each of the impellers 76' and 102'. The turbine torque of each of the hydrokinetic units is distributed as in the previous embodiment through their respective drive chains 100' and 126' to the ring gears 18' and 34' respectively. The speed ratio in the bypass hydrokinetic portion of the circuit can be changed, as in the previous embodiment, by engaging and disengaging brake 68'. This establishes either a direct drive through the gearing 54' or an overdrive.

Having thus described a preferred form of my invention, what I claim and desired to secure by U.S. Letters Patent is:

1. An assembly of an internal combustion engine and a power transmission mechanism comprising an engine crankshaft, a pair of axle shafts, one axle shaft being situated on each end of the crankshaft and being substantially aligned therewith, a pair of hydrokinetic torque converter units mounted for rotation about an axis that is parallel to the axis of said crankshaft, each hydrokinetic unit comprising an impeller, a turbine and a stator situated in toroidal fluid flow relationship, said impellers being connected together for rotation in unison, a first output planetary gear unit at one end of said crankshaft, a second output planetary unit at the other end of said crankshaft, each output gear unit comprising a sun gear, a ring gear and a planet carrier, pinions carried by said carrier and arranged in meshing engagement with said sun and ring gears, each sun gear being connected directly to its adjacent end of said crankshaft, a driving connection between said crankshaft and said impellers, axially spaced torque delivery elements mounted for rotation about the axis of said hydrokinetic units, a driving connection between one torque delivery element and the ring gear of said first output gear unit, a driving connection between the other torque delivery element and the ring gear of the other output gear unit, the carrier of each output gear unit being connected drivably to its adjacent axle shaft, separate clutch and brake means for connecting drivably each turbine to a separate one of said torque delivery elements and for braking each turbine.

2. The combination set forth in claim 1 wherein the driving connection between said crankshaft and said impellers comprises an intermediate planetary gear set with a ring gear, a sun gear and planet pinions situated in meshing engagement with said sun and ring gears, a carrier for rotatably supporting said pinions, selectively engageable brake means for anchoring the sun gear of said intermediate gear set, the ring gear of said intermediate gear set being connected to said impellers whereby said impellers are overspeeded with respect to said carrier when the sun gear of said intermediate gear set is anchored, and direct drive clutch means for completing a mechanical drive between said crankshaft and said impellers when said selectively engageable brake means is disengaged.

3. The combination set forth in claim 2 wherein the driving connection between each torque delivery element and the ring gear of its associated output gear unit comprises a chain drive element encircling said ring gear and said torque delivery element, said torque delivery element and said ring gear having cooperating sprocket teeth that drivably engage said chain drive.

4. The combination set forth in claim 1 wherein said mechanism includes a releasable brake for establishing a one-way driving connection between each stator and a stationary portion of said mechanism during forward drive operation, and a brake means for anchoring each turbine to said stationary portion of said mechanism during reverse drive operation.

5. The combination set forth in claim 4 wherein the driving connection between each torque delivery element and the ring gear of its associated output gear unit comprises a chain drive element encircling said ring gear and said torque delivery element, said torque delivry element and said ring gear having cooperating sprocket teeth that drivably engage said chain drive.

6. The combination set forth in claim 1 wherein the driving connection between each torque delivery element and the ring gear of its associated output gear unit comprises a chain drive element encircling said ring gear and said torque delivery element, said torque delivery element and said ring gear having cooprating sprocket teeth that drivably engage said chain drive.

References Cited

UNITED STATES PATENTS

| 761,657 | 6/1904 | Christie | 180—48 |
| 1,817,820 | 8/1931 | Higley | 180—49 |
| 2,039,210 | 4/1936 | Bugatti | 180—62 |
| 2,495,101 | 1/1950 | Hoff | 74—664 XR |
| 2,768,536 | 10/1956 | Wolfram | 74—664 |
| 2,894,593 | 7/1959 | Waterman | 180—56 |

FOREIGN PATENTS 698,056  11/1964  Canada.

BENJAMIN HERSH, Primary Examiner

MILTON L. SMITH, Assistant Examiner

U.S. Cl. X.R.

74—650, 664, 720.5